United States Patent
Hernandez-Urbina et al.

(10) Patent No.: US 9,879,464 B2
(45) Date of Patent: Jan. 30, 2018

(54) AUTOMATED WINDOW CLOSURE SYSTEM

(71) Applicants: Cesar D. Hernandez-Urbina, Royal Oak, MI (US); Salvatore G Girimonte, Windsor (CA)

(72) Inventors: Cesar D. Hernandez-Urbina, Royal Oak, MI (US); Salvatore G Girimonte, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/950,328

(22) Filed: Nov. 24, 2015

(65) Prior Publication Data
US 2017/0145729 A1    May 25, 2017

(51) Int. Cl.
| | |
|---|---|
| *E05F 15/689* | (2015.01) |
| *B60J 1/08* | (2006.01) |
| *E05F 15/695* | (2015.01) |

(52) U.S. Cl.
CPC ............ *E05F 15/689* (2015.01); *B60J 1/08* (2013.01); *E05F 15/695* (2015.01); *E05Y 2201/434* (2013.01); *E05Y 2400/32* (2013.01); *E05Y 2400/322* (2013.01); *E05Y 2400/85* (2013.01); *E05Y 2400/854* (2013.01); *E05Y 2900/55* (2013.01)

(58) Field of Classification Search
None
See application file for complete search history.

(56) References Cited

U.S. PATENT DOCUMENTS

| | | | | |
|---|---|---|---|---|
| 4,476,416 | A | | 10/1984 | Licata et al. |
| 5,129,192 | A | * | 7/1992 | Hannush ............ B60H 1/00821 236/49.3 |
| 5,245,217 | A | * | 9/1993 | Honma ................. E05F 15/695 307/10.1 |
| 5,449,987 | A | * | 9/1995 | McMillan ............... E05F 15/71 318/266 |
| 5,698,907 | A | * | 12/1997 | Weber .................... B60J 7/0573 307/10.1 |
| 6,263,272 | B1 | | 7/2001 | Liu et al. |

(Continued)

OTHER PUBLICATIONS

International Search Report and Written Opinion dated Mar. 10, 2017 for International Application No. PCT/US2016/062215, International Filing Date Nov. 16, 2016.

*Primary Examiner* — Katherine W Mitchell
*Assistant Examiner* — Catherine A Kelly
(74) *Attorney, Agent, or Firm* — Ralph E. Smith

(57) ABSTRACT

An automated window closure system for a vehicle and an associated method are provided. The automated window closure system includes a multi-action switch that is electrically connected to a window controller. The multi-action switch has a deactivated state, a first activated state, and second activated state. In operation, the window controller receives information including a window open indicator and a window closed indicator. The window controller initiates a window opening routine when the multi-action switch is in the first activated position. The window controller initiates a window closing routine when the multi-action switch is in the second activated position and the window open indicator is received. Finally, the window controller initiates a window vent routine when the multi-action switch is placed in the second activated state and the window closed indicator is received.

20 Claims, 7 Drawing Sheets

(56) References Cited

U.S. PATENT DOCUMENTS

| | | | |
|---|---|---|---|
| 6,366,040 B1 | 4/2002 | McLennan et al. | |
| 6,509,848 B1 * | 1/2003 | Ogata | G08C 23/04 200/515 |
| 6,541,929 B2 | 4/2003 | Cregeur | |
| 6,748,308 B2 | 6/2004 | Losey | |
| 7,288,907 B2 * | 10/2007 | Kamiya | B60J 5/06 296/146.2 |
| 7,410,202 B2 * | 8/2008 | Rose | B60R 16/005 200/61.71 |
| 7,914,065 B2 * | 3/2011 | Sugawara | E05F 15/695 296/146.2 |
| 8,080,961 B2 * | 12/2011 | Miller | E05F 15/695 318/280 |
| 8,783,884 B2 * | 7/2014 | Baker | G09F 13/04 200/313 |
| 8,827,027 B2 | 9/2014 | Syvret et al. | |
| 9,394,739 B2 * | 7/2016 | Ogawa | E05F 15/695 |
| 2006/0059781 A1 * | 3/2006 | Berklich, Jr. | E05F 11/483 49/352 |
| 2006/0213754 A1 * | 9/2006 | Jarrett | G06F 3/0481 200/43.01 |
| 2007/0095633 A1 | 5/2007 | Sakai | |
| 2008/0302014 A1 * | 12/2008 | Szczerba | B60K 35/00 49/31 |
| 2009/0194395 A1 * | 8/2009 | Yamada | G06F 3/0338 200/14 |
| 2010/0332086 A1 | 12/2010 | Zhao | |
| 2015/0019083 A1 * | 1/2015 | Kalliomaki | E05F 15/695 701/49 |
| 2015/0292253 A1 * | 10/2015 | Hartmann | E05F 15/695 701/49 |

* cited by examiner

AUTOMATED WINDOW CLOSURE SYSTEM

FIELD

The subject disclosure relates to automated window closure systems for vehicles and to methods of controlling movement of windows in vehicles using multi-action switches.

BACKGROUND

This section provides background information related to the present disclosure and is not necessarily prior art.

Vehicles such as automobiles are commonly equipped with power window closure systems, which typically utilize an electric motor to open and close a window of the vehicle. Traditionally, power window closure systems were operated and controlled by the manual manipulation of a toggle switch. In such power window closure systems, the electric motor raises the window for as long as the toggle switch is held in a window-close switch position. The electric motor stops raising the window when the toggle switch is released or when the window reaches a closed position. Similarly, the electric motor opens the window for as long as the toggle switch is held in a window-open switch position. The electric motor stops raising the window when the toggle switch is released or when the window reaches a fully opened position.

In more recent years, vehicles are being built with a greater number of occupant convenience features. To this end, some vehicles have been equipped with automated window closure systems, where the electric motor may continue to open and/or close the window after the toggle switch has been released from the window-open switch position or the window-close switch position, respectively. For example, the electric motor may autonomously move the window to the fully opened position when the toggle switch is briefly moved to the window-open switch position and released while the window is in the closed position. In another example, the electric motor may autonomously move the window to the closed position when the toggle switch is briefly moved to the window-close switch position and released while the window is in the fully opened position. In the automotive industry, such occupant convenience features are commonly referred to as "one-touch down" and "one-touch up" window control features. Such features generally improve convenience and occupant comfort because the occupant is not required to hold the toggle switch in the window-open and/or window-close switch positions for lengthy periods of time (lasting several seconds) in order to move the window from the closed position to the fully opened position and vice versa.

Automated vehicle closure systems however do create other convenience problems. It is particularly difficult to open the window only a short distance to a vent position (i.e. "crack the window") when using a window that is equipped with the "one-touch down" feature. For side door windows, the vent position is sometimes referred to as a "short-drop position" because the window has dropped only a short distance away from the closed position. Instead of lowering the window just a short distance when the toggle switch is moved to the window-open switch position and quickly released (as would be done to crack the window using a traditional power window closure system), the automated vehicle closure system will continue to open the window toward the fully opened position. As a result, the occupant typically must rapidly move the toggle switch from the window-open switch position to the window-close switch position in order to place the window in the vent position. This requirement can become annoying for the occupant.

There have been several attempts to address this convenience problem by modifying known automated window closure systems with an automatic vent feature. One solution is disclosed in U.S. Patent Application Publication No. 2007/0095633, which was published on May 3, 2007 and names Naohiro Sakai as the sole inventor. In this publication, a square, four-contact point switch is provided that can be tilted fore and aft, side to side, or push straight down. When the switch is pushed straight down, the window(s) automatically lower to a vent position. Another solution is disclosed in U.S. Patent Application Publication No. 2010/0332086, which was published on Dec. 30, 2010 and names Ruimin Zhao as the sole inventor. In accordance with this publication, the window(s) automatically lower to a vent position in response to a "double-tap" of the window switch. Neither one of these solutions is ideal because they can be tedious to operate, especially considering that the occupant may have their attention diverted to other interests such as driving. As a result, known solutions tend to be distracting and frustrating to operate.

SUMMARY

This section provides a general summary of the disclosure, and is not a comprehensive disclosure of its full scope or all of its features.

An automated window closure system for a vehicle is disclosed herein with an improved automatic vent feature. The automated window closure system includes a multi-action switch and a window controller. The multi-action switch has a deactivated state, a first activated state, and second activated state. The window controller is electrically connected to the multi-action switch. The window controller receives information including a window open indicator and a window closed indicator. In operation, the window controller initiates a window opening routine when the multi-action switch is in the first activated position. The window controller initiates a window closing routine when the multi-action switch is placed in the second activated position and the window controller receives the window open indicator. In addition, the window controller initiates a window vent routine when the multi-action switch is placed in the second activated state and the window controller receives the window closed indicator.

A method of controlling movement of a window in a vehicle using the multi-action switch described above is also disclosed. The method comprises the steps of: placing the multi-action switch in a first activated state, initiating a window opening routine in response to the step of placing the multi-action switch in the first activated state, and moving the window in a window opening direction in response to the step of initiating the window opening routine. The method also includes the steps of: placing the multi-action switch in a second activated state, initiating a window closing routine in response to the step of placing the multi-action switch in the second activated state when the window is in any position other than a closed position, and moving the window in a window closing direction in response to the step of initiating the window closing routine. The method further includes the steps of: initiating a window vent routine in response to the step of placing the multi-action switch in the second activated state when the window is in the closed position and moving the window in the window opening direction from the closed position to a vent position and stopping the window in the vent position in response to the step of initiating the window vent routine.

Advantageously, the automated window closure system and associated method described herein autonomously move the window of the vehicle to the vent position when the multi-action switch is placed in the second activated state and the window is in the closed position. When the window is in any position other than the closed position, the act of placing the multi-action switch in the second activated state will move the window in the window closing direction. In traditional window closure systems, regardless of whether they are equipped with "one-touch down" and/or "one-touch up" features, placing the switch in the position associated with window closing movement would accomplish nothing when the window is already in the closed position. Accordingly, the automated window closure system and associated method of the subject disclosure utilize a "dead-zone" in traditional window closure systems to control initiation of the window vent routine. This allows occupants to more easily open the window a short distance to the vent position, which may be desirable to cool the vehicle with outside air (including when the vehicle is parked), clear foggy windows, reduce wind-buffeting noise when other window closures are opened (e.g. sun roofs), or provide an opening for tobacco smoke to exit the vehicle. Because the window vent routine is initiated without unfamiliar and difficult to master switch movements, the automated window closure system and associated method of the subject disclosure is less tedious and less distracting to use.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
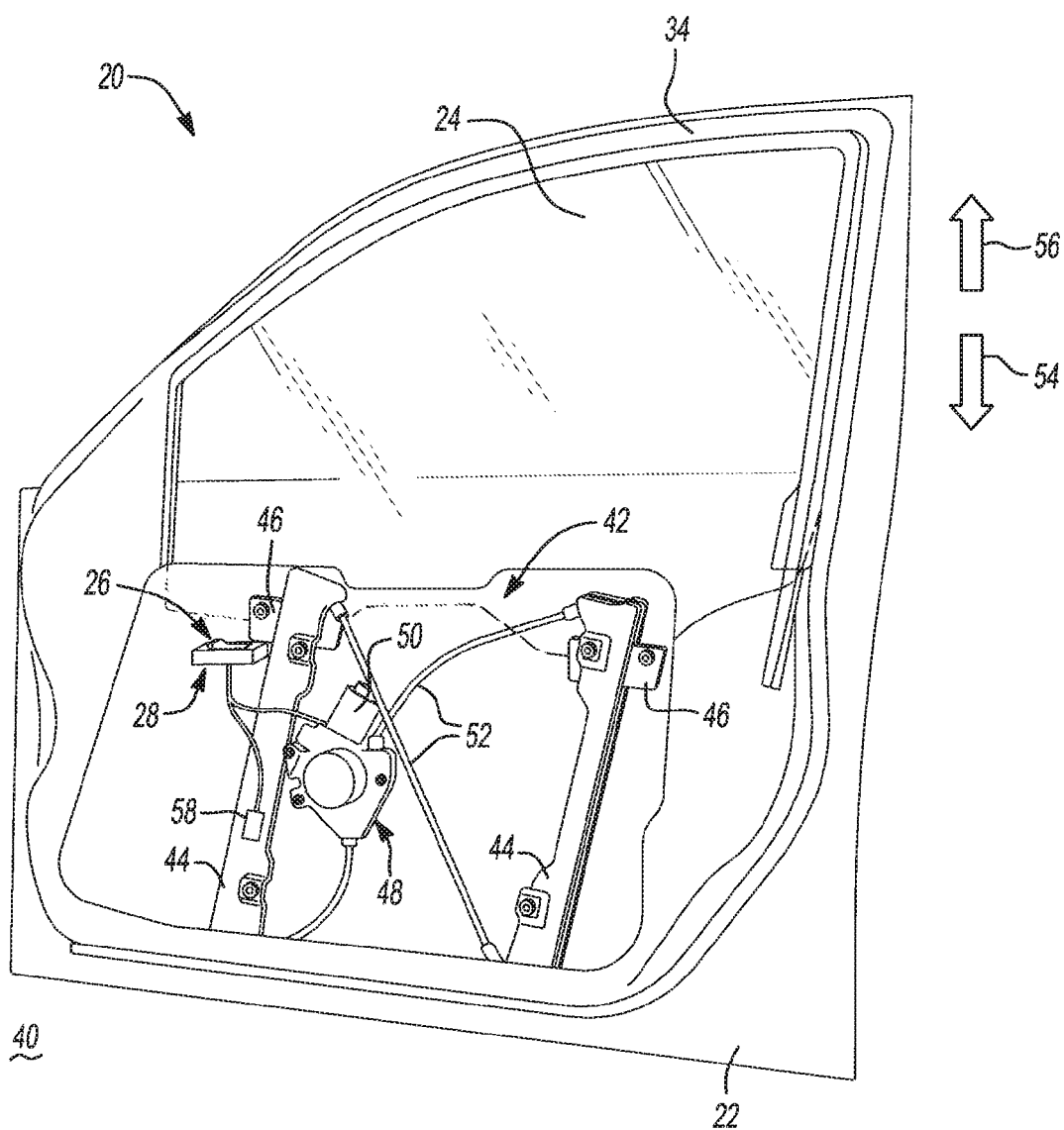
FIG. 1 is a rear perspective view of an exemplary automated window closure system constructed in accordance with the subject disclosure where a window controller and a multi-action switch are shown and where a window of the exemplary automated window closure system is illustrated in a closed position.

Referring to the Figures, wherein like numerals indicate corresponding parts throughout the several views, an automated window closure system 20 for a vehicle 22 is disclosed.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be direct on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
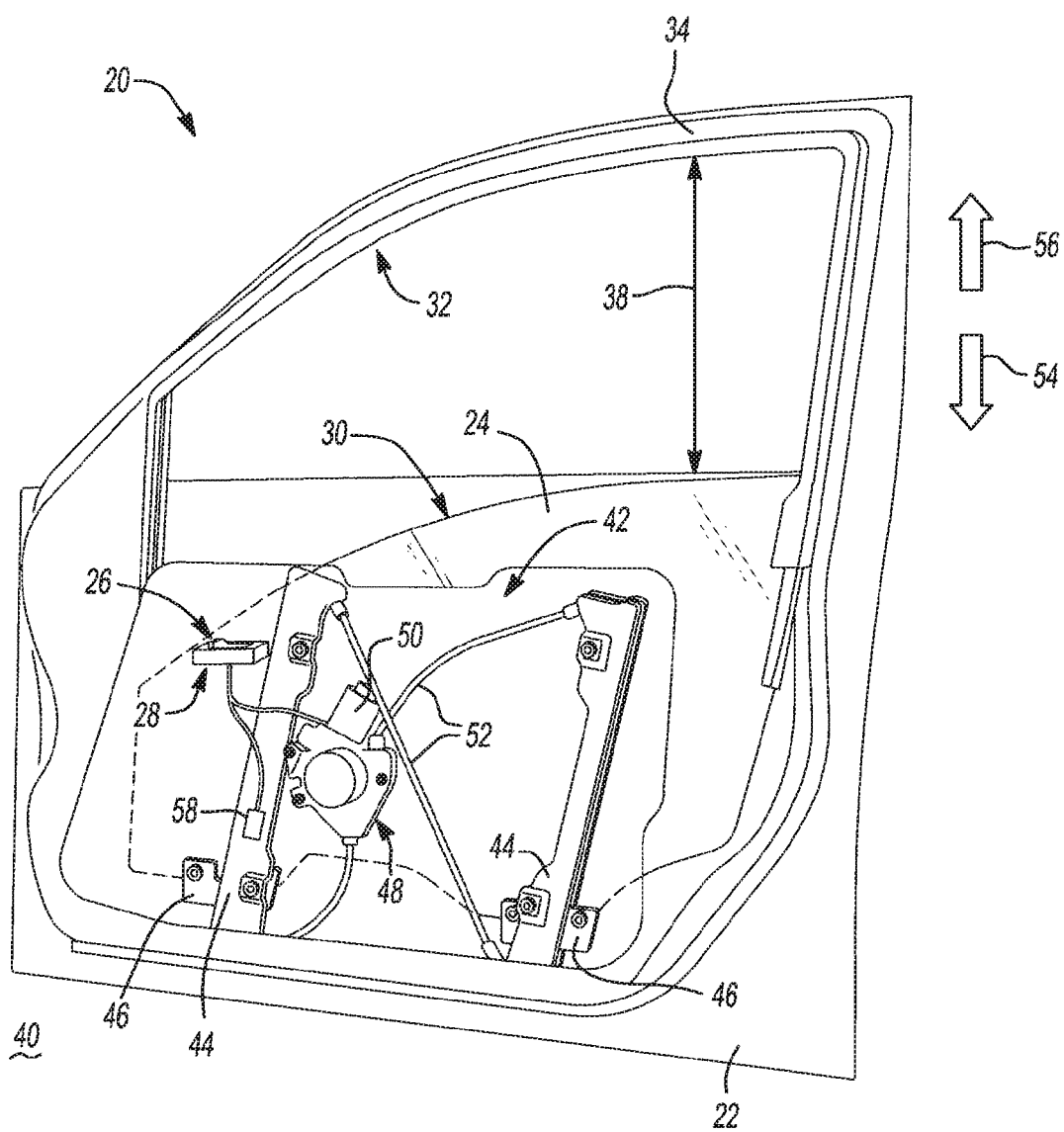
FIG. 2 is a rear perspective view of the exemplary automated window closure system shown in FIG. 1 where the window is illustrated in a fully opened position.
Figure 3:
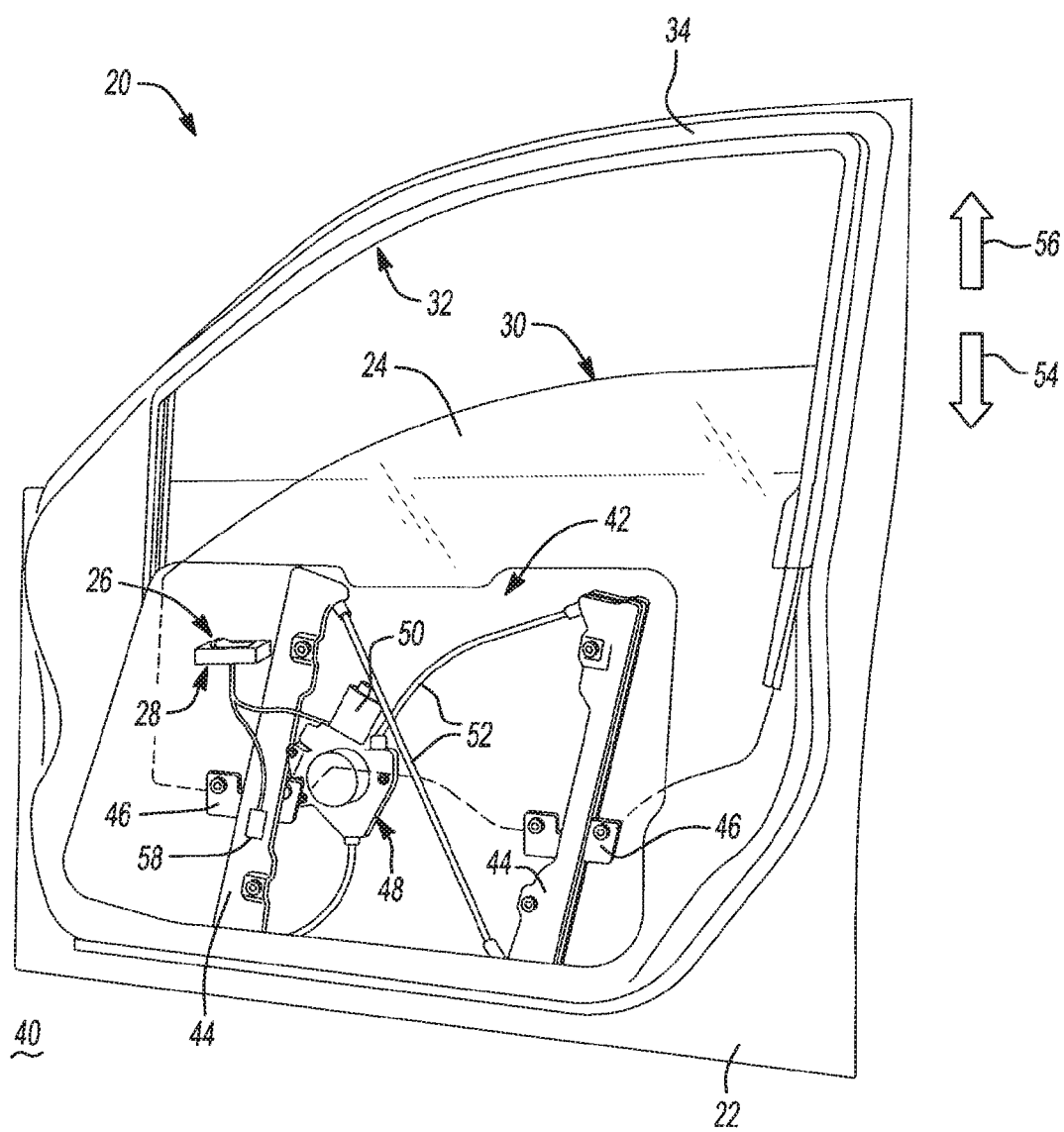
FIG. 3 is a rear perspective view of the exemplary automated window closure system shown in FIG. 1 where the window is illustrated in an intermediate position.
Figure 4:
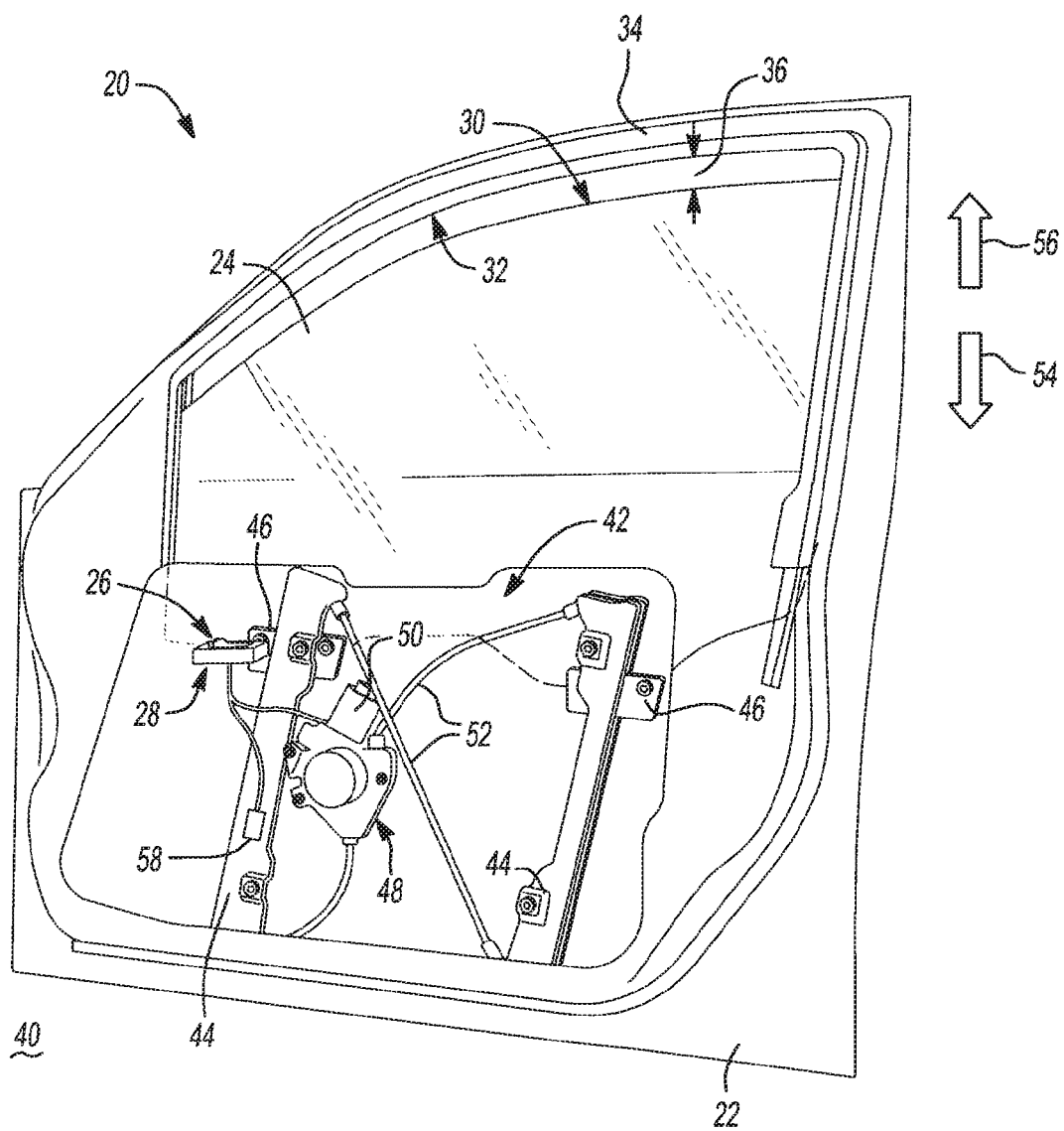
FIG. 4 is a rear perspective view of the exemplary automated window closure system shown in FIG. 1 where the window is illustrated in a vent position.

With reference to FIGS. 1-4, the automated window closure system 20 generally includes a window 24, a multi-action switch 26, and a window controller 28. The window 24 is moveable between a closed position (FIG. 1) and a fully opened position (FIG. 2) with a plurality of intermediate positions there between (FIGS. 3 and 4). As FIGS. 3 and 4 illustrate, the window 24 is positioned between the closed position and the fully opened position when the window 24 is in any one of the intermediate positions. One of the intermediate positions is a vent position (FIG. 4). It should be appreciated that the window 24 may be side door windows of the vehicle 22 (as illustrated) or the window 24 may be other windows of the vehicle 22 such as, without limitation, a sun-roof or a sliding glass rear window (commonly found on pick-up trucks). As such, the window 24 may slide between the closed and fully opened positions in a substantially vertical direction, a substantially horizontal direction, or another direction that is neither vertical nor horizontal.

As best seen in FIGS. 2-4, the window 24 has a distal window edge 30 and the vehicle 22 has a window abutment surface 32 that generally opposed the distal window edge 30. When the window 24 is in the closed position (FIG. 1), the distal window edge 30 contacts the window abutment surface 32 to create a seal. It should be appreciated that the shape of the distal window edge 30, and thus the shape of the window abutment surface 32, may vary from vehicle to vehicle. By way of non-limiting example, the distal window edge 30 and the window abutment surface 32 may be straight or curved and may or may not be horizontally oriented relative to the vehicle 22. It should also be appreciated that the window abutment surface 32 may be defined by a door frame 34 of the vehicle 22 (as shown in FIGS. 1-4) or may be defined by a body panel or roof of the vehicle when the window 24 is frameless in design. In one example, the window abutment surface 32 may be part of a weather seal. The weather seal may be made of a resilient material such as rubber to improve the integrity of the seal between the distal window edge 30 and the window abutment surface 32 when the window 24 is in the closed position (FIG. 1).

As illustrated in FIG. 4, the distal window edge 30 is spaced from the window abutment surface 32 by a first distance 36 when the window 24 is in the vent position. As FIG. 2 illustrates, the distal window edge 30 is spaced from the window abutment surface 32 by a second distance 38 when the window 24 is in the fully opened position. Comparing FIGS. 2 and 4, the second distance 38 is considerably larger than the first distance 36. The first distance 36 may be selected to appropriately vent a passenger compartment 40 of the vehicle 22 and to accommodate one or more design considerations. For example and without limitation, the first distance 36 may be selected to introduce fresh air into the passenger compartment 40 without out providing an opening large enough for a human hand to fit through. This allows the window 24 to be left in the vent position while the vehicle 22 is parked without seriously compromising the security of the vehicle 22. In another non-limiting example, the first distance 36 may be selected to appropriately vent the passenger compartment 40 of the vehicle 22 to clear moisture (i.e. fog) from the windows and/or to permit tobacco smoke to vent from the passenger compartment 40 without introducing excess wind into the vehicle 22 at driving speeds. In yet another non-limiting example, the first distance 36 may be tuned to reduce wind buffeting noise caused by the opening of other window closures, such as other side windows of the vehicle 22 or a sun-roof. By way of example and without limitation, the first distance 36 may be 0.25 inches to 1 inch. The second distance 38 may be dictated by the size of the window 24 itself and/or the design of the vehicle 22 and/or the door frame 34. For most vehicles 22, the second distance 38 is 12 inches or more.

Still referring to FIGS. 1-4, the automated window closure system 20 includes a window regulator assembly 42. In operation, the window regulator assembly 42 displaces (i.e. slides) the window 24 between the closed position and the fully opened position. The window regulator assembly 42 includes one or more regulator tracks 44, one or more carriages 46 supporting the window 24, and an actuator 48. The carriage(s) 46 are mounted on the regulator track(s) 44. In operation, the carriage(s) 46 move relative to the regulator track(s) 44 carrying the window 24 between the closed position and the fully opened position. The actuator 48 is coupled to the carriage(s) 46. By way of non-limiting example, the actuator 48 includes an electric motor 50 that may be electrically connected to the window controller 28 and mechanically coupled to the carriage(s) 46 by one or more cables 52. Where the actuator 48 includes an electric motor 50, the actuator 48 may operate to displace the carriage(s) 46 relative to the regulator track(s) 44 and thus the window 24 in a window opening direction 54 in response to receiving electricity of a first polarity from the window controller 28. By contrast, the actuator 48 may operate to displace the carriage(s) 46 relative to the regulator track(s) 44 and thus the window 24 in a window closing direction 56 in response to receiving electricity of a second polarity from the window controller 28. The second polarity is opposite the first polarity. By way of example and without limitation, the first polarity may be positive twelve volts direct current (+12V DC) and the second polarity may be negative twelve volts direct current (−12V DC). The electric motor 50 rotates in a first rotational direction when electricity of the first polarity is supplied to the actuator 48 and rotates in a second rotational direction that is opposite from the second rotational direction when electricity of the second polarity is supplied to the actuator 48.

The position of the window 24 (i.e. whether the window 24 is in the closed position, the fully opened position, or any one of the intermediate positions) can be determined in one of several ways. In one example, the actuator 48 operably generates electrical pulses that act as a window open indicator and a window closed indicator. The electrical pulses may correspond to each complete (i.e. 360 degree) or half (i.e. 180 degree) rotation of the electric motor 50 of the actuator 48. By counting the electrical pulses, the window controller 28 may determine the position of the window 24. In another example, the automated window closure system 20 may include a window position sensor 58, which may be, without limitation, a contact sensor, a pressure sensor, or an optical sensor. The window position sensor 58 may be electrically connected to the window controller 28. In operation, the window position sensor 58 senses the position of the window 24 and generates the window open indicator in response to sensing the window 24 in any position other than the closed position and the window closed indicator in response to sensing the window 24 in the closed position. Of course both the electrical pulses from the electric motor 50 of the actuator 48 and signals from the window position sensor 58 may be used by the window controller 28 to determine window position.

Figure 5:
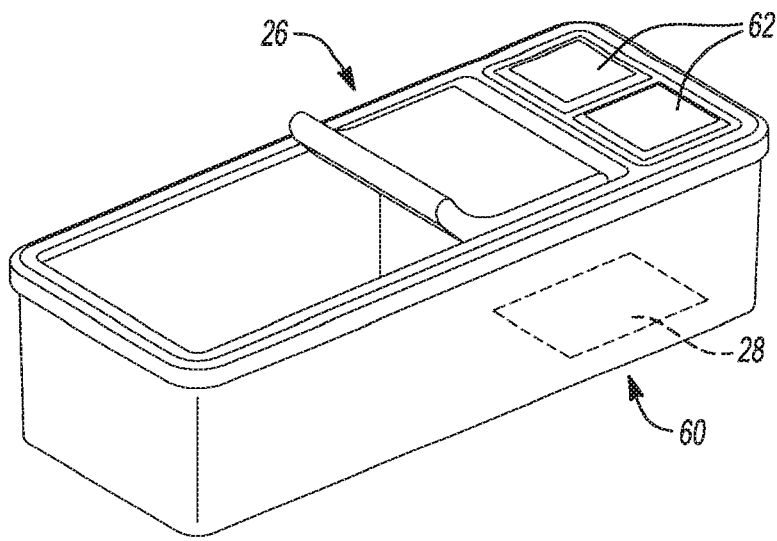
FIG. 5 is a top perspective view of the multi-action switch of the exemplary automated window closure system shown in FIG. 1 where the multi-action switch is illustrated in a deactivated state.
Figure 6:
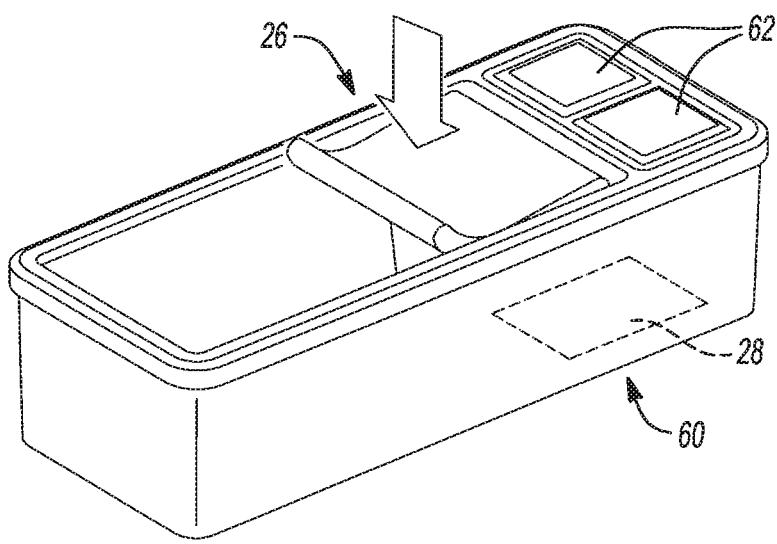
FIG. 6 is a top perspective view of the multi-action switch of the exemplary automated window closure system shown in FIG. 1 where the multi-action switch is illustrated in a first activated state.
Figure 7:
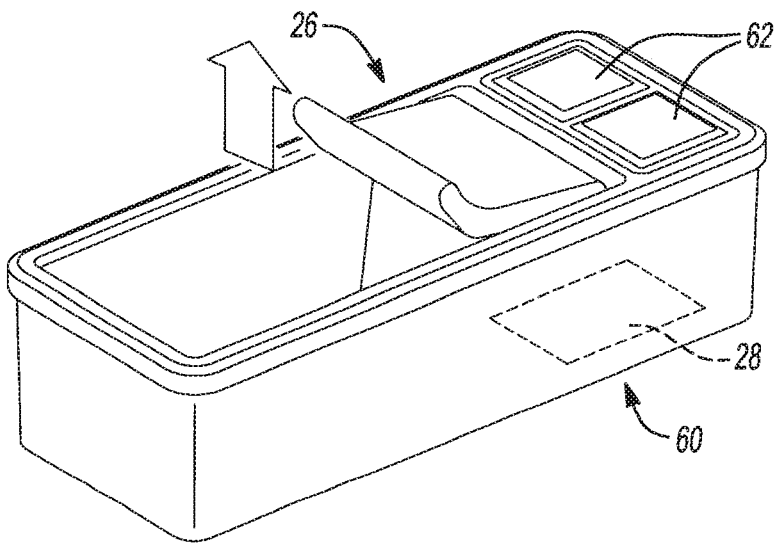
FIG. 7 is a top perspective view of the multi-action switch of the exemplary automated window closure system shown in FIG. 1 where the multi-action switch is illustrated in a second activated state.

With reference to FIGS. 5-7, the multi-action switch 26 shown in FIGS. 1-4 is illustrated in greater detail. The multi-action switch 26 may be part of a switch module 60 that is installed in the passenger compartment 40 of the vehicle 22. The window controller 28 may be internal to the switch module 60 (as shown) or may be external to the switch module 60. In the example shown, the window controller 28 is a circuit board that is installed inside the switch module 60; however, many other configurations are possible. The switch module 60 may also include other switches 62 for controlling other vehicle features such as power window lock-out, power mirrors, and power door locks. The multi-action switch 26 has a deactivated state (FIG. 5), a first activated state (FIG. 6), and a second activated state (FIG. 7). The deactivated state, the first activated state, and the second activated state of the multi-action switch 26 are user selectable by an occupant of the vehicle 22. The multi-action switch 26 is normally biased to the deactivated state (FIG. 5). Accordingly, the multi-action switch 26 stays in one of the first and second activated states (FIGS. 6 and 7) only for as long as the occupant holds the multi-action switch 26 in the first activated state or the second activated state. The multi-action switch 26 may be constructed in various ways. By way of non-limiting example, the multi-action switch 26 may be a toggle switch or a rocker switch such that the multi-action switch 26 physically moves or pivots between the deactivated state (FIG. 5), the first activated state (FIG. 6), and the second activated state (FIG. 7). Alternatively, the multi-action switch 26 may be, without limitation, a capacitive touch switch. In this configuration, the multi-action switch 26 acts like a touch-screen display and therefore the multi-action switch 26 may not physically move between the deactivated state, the first activated state, and the second activated state. In this configuration, the multi-action switch 26 may include a light or graphical display that indicates whether the multi-action switch 26 is in the deactivated state, the first activated state, or the second activated state.

As shown in FIGS. 1-4, the window controller 28 is electrically connected to the multi-action switch 26 and the actuator 48 of the window regulator assembly 42. During operation, the window controller 28 is operable to initiate a window opening routine and a window closing routine. The window controller 28 may have a variety of different electrical components. For example and without limitation, the window controller 28 may have a processor and non-transitory machine readable memory. In operation, the processor of the window controller 28 determines the position of the window 24 in response to receiving at least one of the window open indicator and the window closed indicator from the actuator 48 and/or from the window position sensor 58. The window controller 28 initiates the window opening routine when the multi-action switch 26 is in the first activated state (FIG. 6). The window controller 28 supplies electricity of the first polarity to the actuator 48 of the window 24 regulator during the window opening routine to open the window 24 (i.e. to move the window 24 in the window opening direction 54). The window controller 28 initiates the window closing routine when the multi-action switch 26 is in the second activated state (FIG. 7) and when the window controller 28 receives the window open indicator. In other words, the window controller 28 initiates the window closing routine when the multi-action switch 26 is in the second activated state (FIG. 7) and the window 24 is in any position other than the window closed position (i.e. any position other than the position shown in FIG. 1). The window controller 28 operably supplies electricity of the second polarity to the actuator 48 of the window regulator assembly 42 during the window closing routine to close the window 24 (i.e. to move the window 24 in the window closing direction 56). Alternatively, the window controller 28 may be electrically connected to a power supply (not shown) that is separate from the window controller 28. In accordance with this alternative configuration, the power supply is controlled by the window controller 28 to provide electricity of the first and second polarities to the actuator 48 of the window regulator assembly 42.

The window controller 28 receives electronic signals from the multi-action switch 26 allowing the occupant of the vehicle 22 to control the position "on-demand" where movement of the window 24 stops as soon as the multi-action switch 26 is released from one of the first and second activated states. For example, the non-transitory machine readable memory of the window controller 28 may be programmed with software that commands the window controller 28 to move the window 24 in the window opening direction 54 by supplying electricity of the first polarity to the actuator 48 of the window regulator assembly 42 when: (a) the multi-action switch 26 is placed in the first activated state, and (b) the window 24 is in any position other than the fully opened position. When the window 24 is already in the fully opened position, the window 24 cannot be opened any further. As a result, the window regulator assembly 42 does not supply electricity to the actuator 48 when the multi-action switch 26 is placed in the first activated state while the window 24 is in the fully opened position. The non-transitory machine readable memory of the window controller 28 may also be programmed with software that commands the window controller 28 to move the window 24 in the window closing direction 56 by supplying electricity of the second polarity to the actuator 48 of the window regulator assembly 42 when: (a) the multi-action switch 26 is placed in the second activated state, and (b) the window 24 is in any position other than the closed position. As such, it should be appreciated that in the illustrated examples, the first activated state of the multi-action switch 26 corresponds with moving the window 24 in the window opening direction 54 (e.g. lowering the window 24) and the second activated state of the multi-action switch 26 corresponds with moving the window 24 in the window closing direction 56 (e.g. raising the window 24).

The window controller 28 may optionally provide a "one-touch down" feature where the window controller 28 autonomously moves the window 24 to the fully opened position. The "one-touch down" feature is initiated when the multi-action switch 26 is placed in the first activated state in a particular way. For example, the "one-touch down" feature may activate when the multi-action switch 26 is placed in the first activated state for only a short time period that is less than a pre-determined time limit. If the multi-action switch 26 is placed in the first activated state for a longer time period that exceeds the pre-determined time limit, the "one-touch down" feature will not activate and the window 24 will move in the window opening direction 54 until the multi-action switch 26 is released from the first activated state. The pre-determined time limit may be stored in the non-transitory machine readable memory of the window controller 28. By way of non-limiting example, the pre-determined time limit may equal one second. In accordance with this example, the non-transitory machine readable memory of the window controller 28 may be programmed with software that commands the window controller 28 to move the window 24 in the window closing direction 56 by supplying electricity of the first polarity to the actuator 48 of the window regulator assembly 42 for as long as the multi-action switch 26 is held in the first activated state when: (a) the multi-action switch 26 is held in the first activated state for a period of time that is longer than the predetermined time limit, and (b) the window 24 is in any position other than the fully opened position. In addition, the non-transitory machine readable memory of the window controller 28 may be programmed with software that commands the window controller 28 to autonomously move the window 24 to the fully opened position by supplying electricity of the first polarity to the actuator 48 of the window regulator assembly 42 until the window 24 reaches the fully opened position when: (a) the multi-action switch 26 is placed in the first activated state for a time period that is less than the predetermined time limit, and (b) the window 24 is in any position other than the fully opened position.

In addition to or instead of the "one-touch down" feature, the window controller 28 may optionally provide a "one-touch up" feature where the window controller 28 autonomously moves the window 24 to the closed position. The "one-touch up" feature is initiated when the multi-action switch 26 is placed in the second activated state in a particular way. For example, the "one-touch up" feature may activate when the multi-action switch 26 is placed in the second activated state for only a short time period that is less than the pre-determined time limit. If the multi-action switch 26 is placed in the second activated state for a longer time period that exceeds the pre-determined time limit, the "one-touch up" feature will not activate and the window 24 will move in the window closing direction 56 until the multi-action switch 26 is released from the second activated state. In accordance with this example, the non-transitory machine readable memory of the window controller 28 may be programmed with software that commands the window controller 28 to move the window 24 in the window closing direction 56 by supplying electricity of the second polarity to the actuator 48 of the window regulator assembly 42 for as long as the multi-action switch 26 is held in the second activated state when: (a) the multi-action switch 26 is held in the second activated state for a period of time that is longer than the predetermined time limit, and (b) the window 24 is in any position other than the closed position. In addition, the non-transitory machine readable memory of the window controller 28 may be programmed with software that commands the window controller 28 to autonomously move the window 24 to the closed position by supplying electricity of the second polarity to the actuator 48 of the window regulator assembly 42 until the window 24 reaches the closed position when: (a) the multi-action switch 26 is placed in the second activated state for a time period that is less than the predetermined time limit, and (b) the window 24 is in any position other than the closed position.

In accordance with another example, the multi-action switch 26 may include one or more detents that provide tactile feedback to the occupant when the multi-action switch 26 is moved to the first and/or second activated states. For example, the window controller 28 may activate the "one-touch down" feature in response to the multi-action switch 26 being moved past one of the detents as the multi-action switch 26 is placed in the first activated state and the window controller 28 may activate the "one-touch up" feature in response to the multi-action switch 26 being moved past another one of the detents as the multi-action switch 26 is placed in the second activated state.

In operation, the window controller 28 also initiates a window vent routine when the multi-action switch 26 is placed in the second activated state and the window 24 is in the closed position. As explained above, the window controller 28 may determine that the window 24 is in the closed position in response to receiving the window closed indicator. As an example, the non-transitory machine readable memory of the window controller 28 may be programmed with software that commands the window controller 28 to autonomously move the window 24 to the vent position by supplying electricity of the first polarity to the actuator 48 of the window regulator assembly 42 until the window 24 reaches the vent position when: (a) the multi-action switch 26 is placed in the second activated state, and (b) the window 24 is in the closed position. Optionally, the window controller 28 may initiate the window vent routine only when: (a) the multi-action switch 26 is placed in the second activated state for a time period that is less than the predetermined time limit, and (b) the window 24 is in the closed position.

It should be appreciated that the act of placing the multi-action switch 26 in the second activated state will move the window 24 in the window closing direction 56 whenever the window 24 is in any position other than the closed position. In traditional window closure systems, regardless of whether they are equipped with "one-touch down" and/or "one-touch up" features, placing the switch in the position associated with window closing movement (in this case, the second activated state) would accomplish nothing when the window 24 is already in the closed position. As such, there is a "dead-zone" in traditional window closure systems where placing the switch in the position associated with window closing movement does nothing when the window 24 is in the closed position. The automated window closure system 20 of the subject disclosure utilizes this "dead-zone" to control initiation of the window vent routine, where window controller 28 autonomously moves the window 24 to the vent position when the multi-action switch 26 is placed in the second activated state and the window 24 is in the closed position. Accordingly, additional switch structure and/or complicated switch operation schemes are not necessary to control initiation of the window vent routine. This allows occupants to more easily open the window 24 a short distance to the vent position.

It should be appreciated that moving the window 24 to the vent position may be desirable for several reasons. For example, the occupant may want to place the window(s) 24 of the vehicle 22 in the vent position to cool the vehicle 22 with outside air when underway or when the vehicle 22 is parked. When the vehicle 22 is underway, the vent position allows outside air to enter the passenger compartment 40 without subjecting the occupants to excessive wind and noise. This operation may also be desirable to help clear foggy windows, a condition that sometimes occurs when the humidity of the air inside the passenger compartment 40 is high. This operation may also be desirable to reduce wind-buffeting noise when other window closures are opened (e.g. when a sun roof is opened) or to provide an opening for tobacco smoke to exit the vehicle 22. When the vehicle 22 is parked, moving the window(s) 24 to the vent position may be desirable to help reduce heat buildup within the passenger compartment 40, a condition that commonly occurs in vehicles that are left parked outside on sunny days. Because the distal window edge 30 is closely spaced from the window abutment surface 32 (by the first distance 36) when the window 24 is in the vent position, the vehicle 22 is more secure because a person cannot freely reach into the passenger compartment 40. Because the window vent routine is initiated without unusual and difficult to master switch movements, the automated window closure system 20 disclosed herein is less tedious and less distracting to use.

Figure 8A:
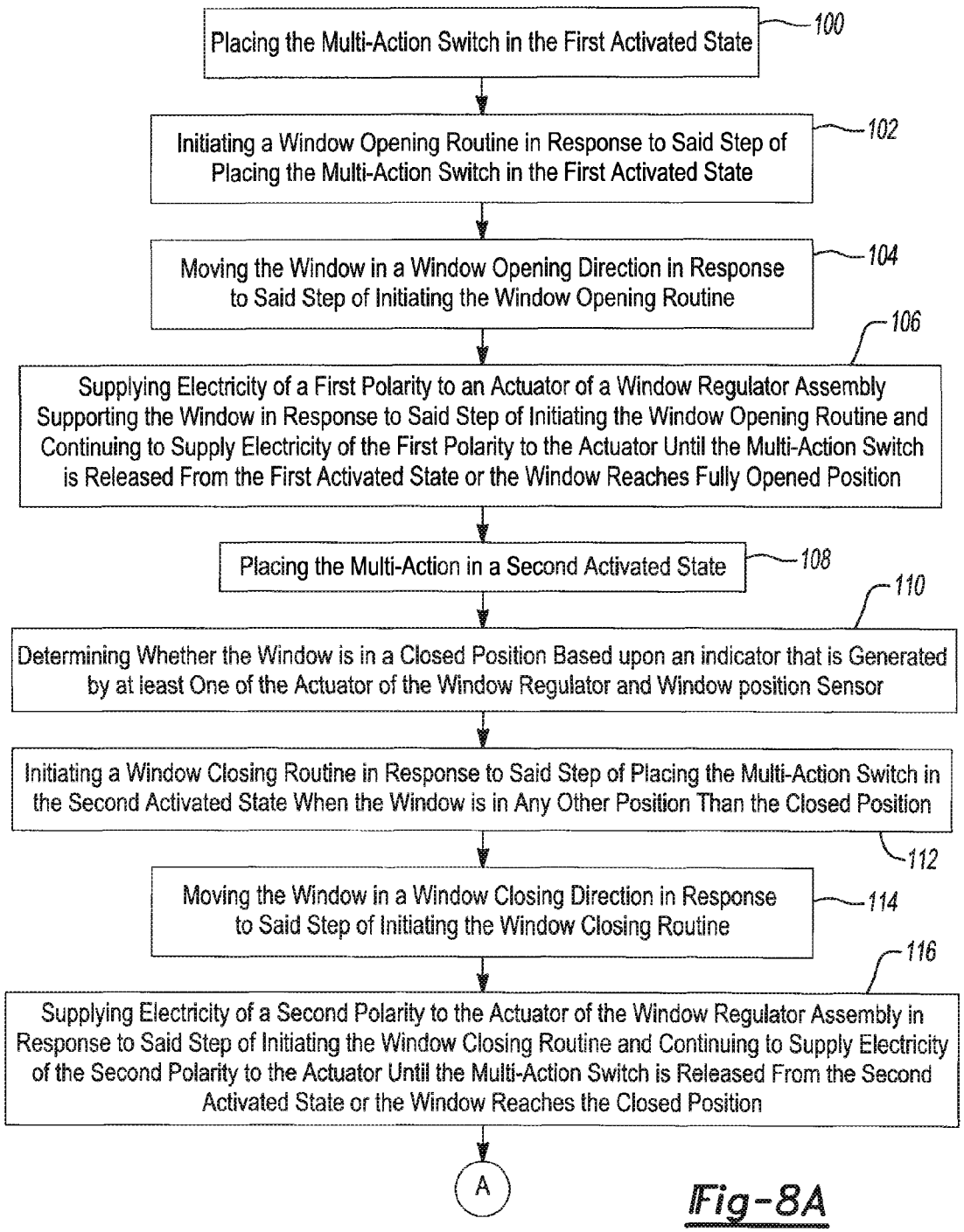
FIG. 8A is a flow diagram illustrating an exemplary method of controlling movement of a window of a vehicle using a multi-action switch.
Figure 8B:
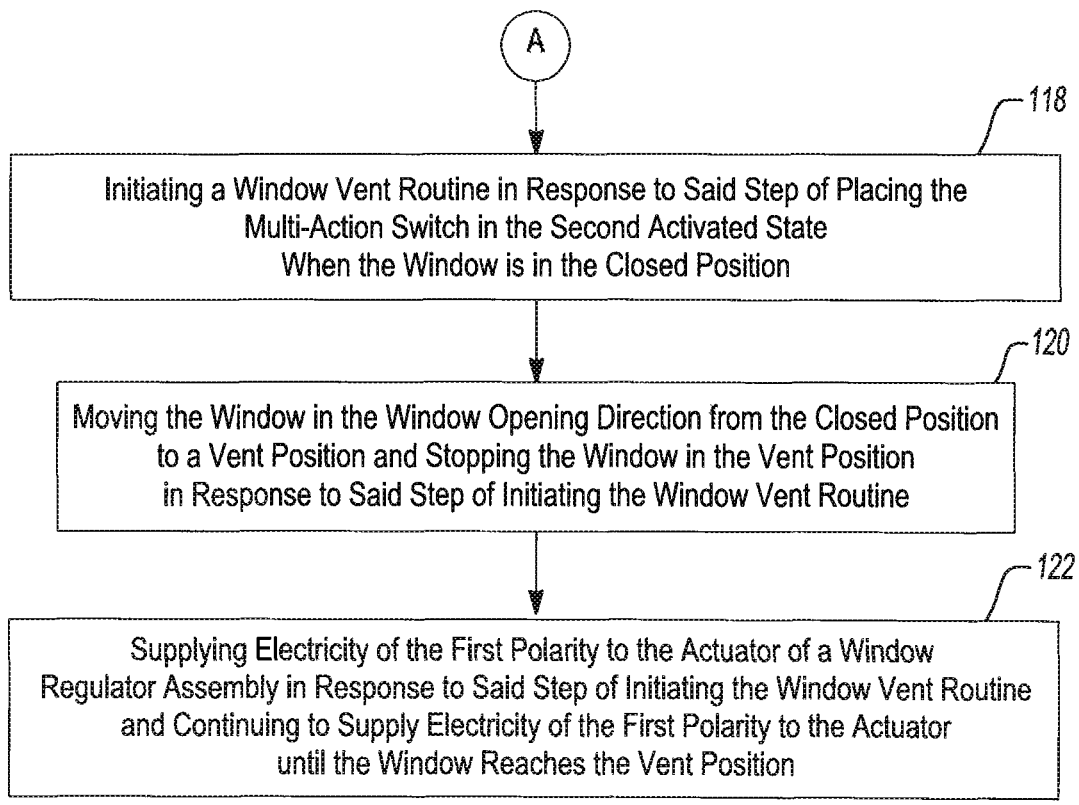
FIG. 8B is a continuation of the flow diagram illustrated in FIG. 8A.

With reference to FIGS. 8A and 8B, the subject disclosure also provides a method of controlling movement of the window 24 using the multi-action switch 26 described above. The steps of the method are illustrated in FIGS. 8A and 8B. Block 100 illustrates the step of placing the multi-action switch 26 in the first activated state. Block 102 illustrates the step of initiating the window opening routine in response to the step of placing the multi-action switch 26 in the first activated state. Block 104 illustrates the step of moving the window 24 in the window opening direction 54 in response to the step of initiating the window opening routine. To this end, the method may further include the step illustrated by Block 106 of supplying electricity of the first polarity to the actuator 48 of the window regulator assembly 42 in response to the step of initiating the window opening routine and continuing to supply electricity of the first polarity to the actuator 48 until the multi-action switch 26 is released from the first activated state or the window 24 reaches the fully opened position. Block 108 illustrates the step of placing the multi-action switch 26 in the second activated state. Block 110 illustrates the step of determining whether the window 24 is in the closed position based upon an indicator that is generated by at least one of the actuator 48 of the window regulator assembly 42 and a window position sensor 58 (i.e. the window closed indicator). Block 112 illustrates the step of initiating the window closing routine in response to the step of placing the multi-action switch 26 in the second activated state when the window 24 is in any position other than the closed position. Block 114 illustrates the step of moving the window 24 in the window closing direction 56 in response to the step of initiating the window closing routine. To this end, the method may include the step illustrated by block 116 of supplying electricity of the second polarity to the actuator 48 of the window regulator assembly 42 in response to the step of initiating the window closing routine and continuing to supply electricity of the second polarity to the actuator 48 until the multi-action switch 26 is released from the second activated state or the window 24 reaches the closed position. Block 118 illustrates the step of initiating the window vent routine in response to the step of placing the multi-action switch 26 in the second activated state when the window 24 is in the closed position. Block 120 illustrates the step of moving the window 24 in the window opening direction 54 from the closed position to the vent position and stopping the window 24 in the vent position in response to the step of initiating the window vent routine. To this end, the method may also include the step illustrated by block 122 of supplying electricity of the first polarity to the actuator 48 of the window regulator assembly 42 in response to the step of initiating the window vent routine and continuing to supply electricity of the first polarity to the actuator 48 until the window 24 reaches the vent position. Therefore, the method described herein provides the ability to easily and conveniently move the window 24 to the closed position, the fully opened position, and the plurality of intermediate positions, including autonomously moving the window 24 to the vent position. It should be appreciated that the order of the method steps described herein is not meant to be limiting unless otherwise noted. Furthermore, the method may be practice by eliminating or adding steps. For example, the method may include additional steps that provide the "one-touch down" and/or "one-touch up" features described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:

1. An automated window closure system for a vehicle comprising:
   a multi-action switch configured to be controlled via manipulation by a vehicle occupant, said multi-action switch having a deactivated state, a first activated state, and second activated state; and
   a window controller electrically connected to said multi-action switch that receives information including a window open indicator and a window closed indicator, said window controller operable to initiate a window opening routine when said multi-action switch is in said first activated position, a window closing routine when said mufti-action switch is in said second activated position and said window controller receives said window open indicator, and a window vent routine when said multi-action switch is placed in said second activated state and said window controller receives said window closed indicator.

2. The automated window closure system as set forth in claim 1, further comprising:
   a window moveable between a closed position and a fully opened position with a plurality of intermediate positions therebetween, one of said intermediate positions being a vent position, wherein said window moves toward said fully opened position when window opening routine is initiated, towards said closed position when said window closing routine is initiated, and to said vent position when said window vent routine is initiated.

3. The automated window closure system as set forth in claim 2, wherein said window includes a distal window edge that contacts a window abutment surface when said window is in said closed position.

4. The automated window closure system as set forth in claim 3, wherein said distal window edge is spaced from said window abutment surface by a first distance when said window is in said vent position and by a second distance when said window is in said fully opened position, said second distance being larger than said first distance.

5. The automated window closure system as set forth in claim 2, further comprising:
   a window regulator assembly that supports said window and operably displaces said window between said closed position and said fully opened position, wherein said window regulator moves said window in a window opening direction when said window opening routine is initiated, moves said window in a window closing direction when said window closing routine is initiated, and moves said window in said window opening direction in said window vent routine until said window reaches said vent position where movement of said window is stopped in said window vent routine.

6. The automated window closure system as set forth in claim 5, wherein said window regulator assembly includes a regulator track, a carriage supporting said window, and an actuator, said carriage mounted on said regulator track for movement relative to said regulator track, said actuator coupled to said carriage and electrically connected to said window controller, said actuator operably displacing said carriage relative to said regulator track in said window opening direction in response to receiving electricity of a first polarity from said window controller, and said actuator operably displacing said carriage relative to said regulator track in said window closing direction in response to receiving electricity of a second polarity from said window controller.

7. The automated window closure system as set forth in claim 6, wherein said window controller operably supplies electricity of said first polarity to said actuator of said window regulator when said multi-action switch is placed in said first activated state and said window is in any position other than said fully opened position and supplies electricity of said second polarity to said actuator of said window regulator when said multi-action switch is placed in said second activated state and said window is in any position other than said closed position.

8. The automated window closure system as set forth in claim 6, wherein said window controller autonomously moves said window to said vent position when said multi-action switch is placed in said second activated state and said window is in said closed position by supplying electricity of said first polarity to said actuator of said window regulator until said window reaches said vent position.

9. The automated window closure system as set forth in claim 6, wherein said window controller autonomously moves said window to said vent position when said multi-action switch is placed in said second activated state for a time period that is less than a predetermined time limit and said window is in said closed position by supplying electricity of said first polarity to said actuator of said window regulator until said window reaches said vent position.

10. The automated window closure system as set forth in claim 6, wherein said window controller moves said window in said window opening direction when said multi-action switch is held in said first activated state for a period of time that is longer than a predetermined time limit and said window is in any position other than said fully opened position by supplying electricity of said first polarity to said actuator of said window regulator for as long as said multi-action switch is held in said first activated state.

11. The automated window closure system as set forth in claim 10, wherein said window controller autonomously moves said window to said fully opened position when said multi-action switch is placed in said first activated state for a time period that is less than said predetermined time limit and said window is in any position other than said fully opened position by supplying electricity of said first polarity to said actuator of said window regulator until said window reaches said fully opened position.

12. The automated window closure system as set forth in claim 6, wherein said window controller moves said window in said window closing direction when said multi-action switch is held in said second activated state for a period of time that is longer than a predetermined time limit and said window is in any position other than said closed position by supplying electricity of said second polarity to said actuator of said window regulator for as long as said multi-action switch is held in said second activated state.

13. The automated window closure system as set forth in claim 12, wherein said window controller autonomously moves said window to said closed position when said multi-action switch is placed in said second activated state for a time period that is less than said predetermined time limit and said window is in any position other than said closed position by supplying electricity of said second polarity to said actuator of said window regulator until said window reaches said closed position.

14. The automated window closure system as set forth in claim 6, wherein said actuator generates electrical pulses during operation that act as said window open indicator and said window closed indicator such that said window controller operably determines window position by monitoring said electrical pulses generated by said actuator.

15. The automated window closure system as set forth in claim 2, further comprising:
a window position sensor electrically connected to said window controller that operably senses window position and generates said window open indicator in response to sensing said window in any position other than said closed position and that generates said window closed indicator in response to sensing said window in said closed position, said window controller electrically connected to said window position sensors and operably determining window position in response to receiving at least one of said window open indicator and said window closed indicator from said window position sensor.

16. A method of controlling movement of a window in a vehicle using a multi-action switch configured to be controlled via manipulation by a vehicle occupant the method comprising the steps of:
placing the multi-action switch in a first activated state;
initiating a window opening routine in response to said step of placing the multi-action switch in the first activated state;
moving the window in a window opening direction in response to said step of initiating the window opening routine;
placing the multi-action switch in a second activated state;
initiating a window closing routine in response to said step of placing the multi-action switch in the second activated state when the window is in any position other than a closed position;
moving the window in a window closing direction in response to said step of initiating the window closing routine;
initiating a window vent routine in response to said step of placing the multi-action switch in the second activated state when the window is in the closed position; and
moving the window in the window opening direction from the closed position to a vent position and stopping the window in the vent position in response to said step of initiating the window vent routine.

17. The method as set forth in claim 16, further comprising the steps of:
supplying electricity of a first polarity to an actuator of a window regulator supporting the window in response to said step of initiating the window opening routine and continuing to supply electricity of the first polarity to the actuator until the multi-action switch is released from the first activated state or the window reaches a fully opened position.

18. The method as set forth in claim 17, further comprising the steps of:

supplying electricity of a second polarity to the actuator of the window regulator in response to said step of initiating the window closing routine and continuing to supply electricity of the second polarity to the actuator until the multi-action switch is released from the second activated state or the window reaches the closed position.

19. The method as set forth in claim 18, further comprising the steps of:

supplying electricity of the first polarity to the actuator of the window regulator in response to said step of initiating the window vent routine and continuing to supply electricity of the first polarity to the actuator until the window reaches the vent position.

20. The method as set forth in claim 16, further comprising:

determining whether the window is in the closed position based upon an indicator that is generated by at least one of an actuator of a window regulator supporting the window and a window position sensor.

* * * * *